(12) United States Patent
Kiilstofte Hansen et al.

(10) Patent No.: US 10,205,179 B2
(45) Date of Patent: Feb. 12, 2019

(54) ELECTRICALLY INSULATING GASKET FOR SOC UNIT

(71) Applicant: Haldor Topsøe A/S, Kgs. Lyngby (DK)

(72) Inventors: Lars Kiilstofte Hansen, Odense (DK); Cliver Søren Klitholm, Søborg (DK); Thomas Heiredal-Clausen, Copenhagen Ø (DK); Niels Erikstrup, Frederiksberg (DK); Martin Refslund Nielsen, Birkerød (DK)

(73) Assignee: Haldor Topsoe A/S, Lyngby (DK)

( * ) Notice: Subject to any disclaimer, the term of this patent is extended or adjusted under 35 U.S.C. 154(b) by 73 days.

(21) Appl. No.: 15/122,479

(22) PCT Filed: Mar. 30, 2015

(86) PCT No.: PCT/EP2015/056855
§ 371 (c)(1),
(2) Date: Aug. 30, 2016

(87) PCT Pub. No.: WO2015/150306
PCT Pub. Date: Oct. 8, 2015

(65) Prior Publication Data
US 2017/0084930 A1 Mar. 23, 2017

(30) Foreign Application Priority Data
Apr. 4, 2014 (EP) .................................. 14163492

(51) Int. Cl.
*H01M 8/0282* (2016.01)
*H01M 8/2425* (2016.01)
*H01M 8/0297* (2016.01)
*H01M 8/04089* (2016.01)
*H01M 8/124* (2016.01)

(52) U.S. Cl.
CPC ....... *H01M 8/0282* (2013.01); *H01M 8/0297* (2013.01); *H01M 8/2425* (2013.01); *H01M 8/04089* (2013.01); *H01M 2008/1293* (2013.01)

(58) Field of Classification Search
None
See application file for complete search history.

(56) References Cited

U.S. PATENT DOCUMENTS

| 2006/0121327 A1 | 6/2006 | Keller et al. |
| 2014/0030633 A1* | 1/2014 | Palermo ................. F16J 15/128 429/510 |

FOREIGN PATENT DOCUMENTS

| DE | 103 02 124 A1 | 7/2004 |
| EP | 2 224 526 A1 | 9/2010 |
| JP | 2013-61056 A | 4/2013 |
| WO | WO 2012/143428 A1 | 10/2012 |

OTHER PUBLICATIONS

Machine translation of JP2013-061056 published Apr. 2013.*
(Continued)

*Primary Examiner* — Wyatt P McConnell
(74) *Attorney, Agent, or Firm* — Blank Rome LLP

(57) ABSTRACT

A sandwiched gasket is used for an SOC stack system to provide flexible, yet electrically insulation properties to the sealing between mounting interfaces of the system.

15 Claims, 1 Drawing Sheet

(56) References Cited

OTHER PUBLICATIONS

W. Zhang et al., "Development of $Al_2O_3$/glass-based Multi-Layer Composite Seals for Planar Intermediate-temperature Solid Oxide Fuel Cells", International Journal of Hydrogen Energy, vol. 38, No. 35, pp. 15371-15378 (2013).
S. P. Simner et al., "Compressive Mica Seals for SOFC Applications", Journal of Power Sources, vol. 102, No. 1-2, pp. 310-316 (2001).

* cited by examiner

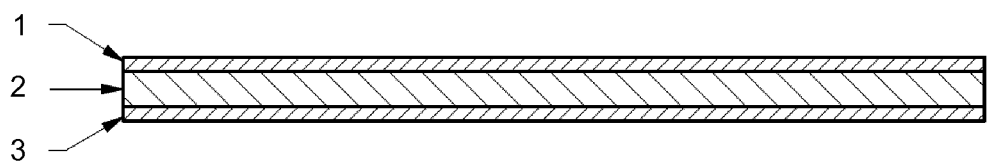

ELECTRICALLY INSULATING GASKET FOR SOC UNIT

FIELD OF THE INVENTION

The invention relates to a gasket for a solid oxide cell (SOC) stack system, in particular a solid oxide fuel cell (SOFC) stack system or a solid oxide electrolysis cell (SOEC) stack system.

BACKGROUND OF THE INVENTION

In the following, the structure of a solid oxide cell stack is explained in relation to fuel cells. The fuel cells may however also run in "reverse mode" and thus operate as electrolysis cells.

A Solid Oxide Fuel Cell (SOFC) comprises a solid electrolyte that enables the conduction of oxygen ions, a cathode where oxygen is reduced to oxygen ions and an anode where hydrogen is oxidised. The overall reaction in a SOFC is that hydrogen and oxygen electrochemically react to produce electricity, heat and water. In order to produce the required hydrogen, the anode normally possesses catalytic activity for the steam reforming of hydrocarbons, particularly natural gas, whereby hydrogen, carbon dioxide and carbon monoxide are generated. Steam reforming of methane, the main component of natural gas, can be described by the following equations:

$$CH_4 + H_2O \rightarrow CO + 3H_2$$

$$CH_4 + CO_2 \rightarrow 2CO + 2H_2$$

$$CO + H_2O \rightarrow CO_2 + H_2$$

During operation an oxidant such as air is supplied to the solid oxide fuel cell in the cathode region. Fuel such as hydrogen is supplied in the anode region of the fuel cell. Alternatively, a hydrocarbon fuel such as methane is supplied in the anode region, where it is converted to hydrogen and carbon oxides by the above reactions. Hydrogen passes through the porous anode and reacts at the anode/electrolyte interface with oxygen ions generated on the cathode side that have diffused through the electrolyte. Oxygen ions are created in the cathode side with an input of electrons from the external electrical circuit of the cell.

To increase voltage, several cell units are assembled to form a stack and are linked together by interconnects. Interconnects serve as a gas barrier to separate the anode (fuel) and cathode (air/oxygen) sides of adjacent cell units, and at the same time they enable current conduction between the adjacent cells, i.e. between an anode of one cell with a surplus of electrons and a cathode of a neighbouring cell needing electrons for the reduction process. Further, interconnects are normally provided with a plurality of flow paths for the passage of fuel gas on one side of the interconnect and oxidant gas on the opposite side. To optimize the performance of a SOFC stack, a range of positive values should be maximized without unacceptable consequence on another range of related negative values which should be minimized. Some of these values are:

| VALUES TO BE MAXIMIZED | VALUES TO BE MINIMIZED |
|---|---|
| Fuel utilization | Price |
| electrical efficiency | Dimensions |
| life time | (temperature, to a point) |
| | production time |
| | fail rate |
| | number of components |
| | Parasitic loss (heating, cooling, blowers.) |

Almost all the above listed values are interrelated, which means that altering one value will impact other values. Some relations between the characteristics of gas flow in the fuel cells and the above values are mentioned here:

Fuel Utilization:

The flow paths on the fuel side of the interconnect should be designed to seek an equal amount of fuel to each cell in a stack, i.e. there should be no flow-"short-cuts" through the fuel side of the stack.

Parasitic Loss:

Design of the process gas flow paths in the SOFC stack and its fuel cell units should seek to achieve a low pressure loss per flow volume at least on the air side and potentially on the fuel side of the interconnect, which will reduce the parasitic loss to blowers.

Electric Efficiency:

The interconnect leads current between the anode and the cathode layer of neighbouring cells. Hence, to reduce internal resistance, the electrically conducting contact points (hereafter merely called "contact points") of the interconnect should be designed to establish good electrically contact to the electrodes (anode and cathode) and the contact points should no where be far apart, which would force the current to run through a longer distance of the electrode with resulting higher internal resistance.

Lifetime:

Depends in relation to the interconnect on even flow distribution on both fuel and air side of the interconnect, few components and even protective coating on the materials among others.

Price:

The interconnects price contribution can be reduced by not using noble materials, by reducing the production time of the interconnect and minimizing the material loss.

Dimensions:

The overall dimensions of a fuel stack is reduced, when the interconnect design ensures a high utilization of the active cell area. Dead-areas with low fuel- or air flow should be reduced and inactive zones for sealing surfaces should be minimized.

Temperature:

The temperature should be high enough to ensure catalytic reaction in the cell, yet low enough to avoid accelerated degradation of the cell components. The interconnect should therefore contribute to an even temperature distribution giving a high average temperature without exceeding the maximum temperature.

Production Time.

Production time of the interconnect itself should be minimized and the interconnect design should also contribute to a fast assembling of the entire stack. In general, for every component the interconnect design renders unnecessary, there is a gain in production time.

Fail Rate.

The interconnect production methods and materials should permit a low interconnect fail rate (such as unwanted holes in the interconnect gas barrier, uneven material thickness or characteristics). Further the fail-rate of the assembled cell stack can be reduced when the interconnect design reduces the total number of components to be assembled and reduces the length of seal surfaces.

Number of Components.

Apart from minimizing errors and assembling time as already mentioned, a reduction of the number of components leads to a reduced price.

The way the anode and cathode gas flows are distributed in an SOFC stack is by having a common manifold for each of the two process gasses. The manifolds can either be internal or external. The manifolds supply process gasses to the individual layers in the SOFC stack by the means of channels to each layer. The channels are normally situated in one layer of the repeating elements which are comprised in the SOFC stack, i.e. in the spacers or in the interconnect.

When operating a SOC stack, connections to the stack are necessary. It is at least necessary to have process gas connections and electrical connections. Manifolds and piping are used to connect a stack with process gas. In some embodiments, it is necessary to apply gaskets between the manifolds and piping, and the SOC stack.

As SOC stacks operate at high temperatures often above 700° C., the gaskets need to be able to withstand multiple thermal cycles and still be leak proof. It is a requirement to the SOC stacks that they can be electrically connected in series and that they are electrically floating, i.e. none of the stacks are electrically grounded. Therefore the gaskets need also to be electrically insulating.

US2005266288 discloses a solid oxide fuel cell generator that contains stacks of hollow axially elongated fuel cells having an open top end, an oxidant inlet plenum, a feed fuel plenum, a combustion chamber for combusting reacted oxidant/spent fuel; and, optionally, a fuel recirculation chamber below the combustion chamber, where the fuel recirculation chamber is in part defined by semi-porous fuel cell positioning gasket, all within an outer generator enclosure, wherein the fuel cell gasket has a laminate structure comprising at least a compliant fibrous mat support layer and a strong, yet flexible woven layer, which may contain catalytic particles facing the combustion chamber, where the catalyst, if used, is effective to further oxidize exhaust fuel and protect the open top end (37) of the fuel cells.

US2006121327 describes a solid-oxide fuel cell assembly comprising a plurality of components having electrically-conductive mating surfaces there between, the surfaces are sealed by an electrically insulating gasket that include a mineral composition comprising about 66 mol percent MgO and about 33 mol percent $SiO_2$, the mineral composition being known mineralogically as forsterite. A brazing alloy may be applied to enhance bonding of the gasket into place. The gasket composition may include additions of $Al_2O_3$ to enhance electrical resistivity while having little to no impact of matching expansion coefficients of the gasket and metal mating surfaces. Also, additions such as titania or zirconia to inhibit glassy phase grain boundaries and the formation of impurities and pores in the ceramic grain boundaries may be used. A recommended particle size distribution of precursor powders is disclosed that leads to an optimum microstructure of the sintered gasket.

None of the above described known art provides a simple, efficient and fail-safe solution to the above described problems.

Therefore, with reference to the above listed considerations, there is a need for a robust, simple, cheap and easy to produce and handle gas tight, temperature resistant, electrically insulating and vibration resistant gasket for a solid oxide fuel cell stack system. As corresponding cell stack systems can also be used for solid oxide electrolysis, this gasket solution can also be used for a SOEC stack system; hence a solution is sought for a SOC stack system.

These and other objects are achieved by the invention as described below and in the claims.

SUMMARY OF THE INVENTION

When a single soft mica gasket (such as a "Statotherm") is used as a seal between a SOC stack and the adjacent manifolds, multiple thermal cycles will move the gasket in its plane due to differences in coefficient of thermal expansion of the involved components. After several thermal cycles, 20-30, the dislocation can be so large that cracks are formed in the gasket, causing leakage.

A solution well known in the art is to increase the roughness of the flanges of the adjacent manifolds. There is however also the requirement that the gasket has to be electrically insulating. The soft mica gasket is unreliable as an electrical insulator. Short circuits have been observed already at 100 V over a 1 mm gasket. As a consequence the soft mica gasket cannot do the job alone. The electrically insulating materials identified so far, are all too inflexible for establishing reliable gas sealing at the low compression forces that are preferred in SOC stack systems, where high forces are difficult to establish due to high temperatures and the onset of creep in all metals.

The solution is to make a layered gasket, in which an electrically insulating layer is sandwiched between two soft gaskets (i.e. soft mica). Thereby the electrical insulation effect can be chosen from a wide range of materials (i.e. hard mica) and at the same time establish a good sealing at low compression.

The sequence of materials is thereby: First a mounting interface (1) such as a metal manifold or flanged piping, then a soft, flexible gasket layer (2), then an electrically insulating gasket layer (3), then a soft, flexible gasket (4) and then the mounting interface of an SOC stack (5).

Such a design will however have the potential for in plane movement of the gasket layers during thermal cycling or vibrations during operation and any other movements of the SOC stack system parts. There are a total of four interfaces where sliding may occur: 1-2, 2-3, 3-4 and 4-5.

For the interfaces 1-2 and 4-5 the combination of materials are well known, and the solution can be the same as recommended by the ASME standards and known in the art, such as roughness of the mounting interfaces 1 and 5 (manifolds, flanges and SOC stack mounting interface).

But for the interfaces 2-3 and 3-4 a new method of fixing in combination with the gasket sandwich layers is introduced according to the present invention. Any one or more of the gasket layers is manufactured with one or multiple holes, indents or bulges in the sealing area. This can be done when the gasket layer is cut to shape. As the gasket layers are sandwiched together under compression, a gasket layer adjacent to a gasket layer with the holes or indents will then bulge into the holes or indents, which establish the required fix of the gasket layers relative to each other. Likewise, a gasket layer adjacent to a gasket layer with a bulge, will achieve an indent at the location opposite the bulge, when the gasket layers are sandwiched together under compression, which also establish the required fix of the gasket layers relative to each other. This solution can for instance be applied to the mid gasket layer, which is more rigid than the two surrounding gasket layers of the gasket sandwich. In this way, only one gasket layer needs to be applied with holes, indents or bulges, and the two surrounding gasket layers which are more flexible will then bulge into the holes or indents, or get indentations where the bulges of the mid gasket layers are located. Thereby all interfaces are fixed and cannot move in the plane during operation of the SOC stack and during thermal cycling.

BRIEF DESCRIPTION OF THE DRAWINGS

FIG. 1 shows a cross sectional view of a gasket according to an embodiment of the invention

DETAILED DESCRIPTION

In an embodiment of the invention, a solid oxide cell stack system comprising a plurality of stacked cells has a cell stack with mounting interfaces for mounting applications to the stack, i.e. process gas piping or process gas manifolds. Also the applications to be connected to the stack have mounting interfaces, such as flanges. To acquire a gas tight connection of the stack to the applications, but at the same time electrically insulate the stack from the connected applications, the mounting interfaces further comprise at least one gasket to be mounted in between the stack mounting interfaces and the adjacent mounting interfaces of the applications.

To achieve flexibility to compensate for vibrations, surface defects of the mounting interfaces and thermally originated movements, the gasket comprise two layers, a first and a third layer which have these properties and are flexible enough to compensate for them. Flexible enough means that it can compensate for the mentioned movements, vibrations and surface defects during normal operation and start-up/shut-down cycles of the SOC cell stack system without breaking or leaking.

To also achieve electrically insulation of the stack from the mounted applications, the gasket further comprise a second gasket layer which is sandwiched between the first and the third layer which has electrically insulating properties which are sufficient to prevent short-circuiting of the cell stack and electrical connection of the stack to the mounted applications during normal operation and start-up/shutdown cycles of the SOC cell stack system. In FIG. 1 a side cut view of the gasket according to this embodiment can be seen, position number 1 and 3 shows the flexible layers and position number 2 shows the electrically insulating layer.

In an embodiment of the invention, all three gasket layers are made of mica, the first and the third layer are made of a mica material with properties providing the mentioned necessary flexibility. The second layer, less flexible than the first and the third layer has properties providing the necessary electrical insulation.

In embodiments of the invention, the tensile strength of the second layer is between 60 and 180 N/mm2, preferably between 90 and 150 N/mm2. The compressive strength at 200° C. of the second layer is between 180 and 300 N/mm2, preferably between 220 and 260 N/mm2. And the flexural strength of the second layer is between 150 and 250 N/mm2, preferably between 140 and 200 N/mm2.

In an embodiment of the invention, the thickness of each of the gasket layers is between 0.2 mm and 15 mm, preferably between 0.4 and 5 mm. The thickness of each of the layers can be varied to achieve the necessary flexibility, sealing and electrical insulation.

In an embodiment of the invention, the flexibility of at least the first and the third layer is utilized to provide a fix between each of the gasket layers and further between the gasket and the adjacent mounting interfaces. Indentations, holes or bulges are made in at least one of the three gasket layers (i.e. in the second layer) to provide fixation of the layers relative to each other.

In a further embodiment of the invention, the same principle is utilized to provide fixation of the gasket relative to the adjacent mounting interfaces in contact with the gasket, to prevent movement in the plane of the mounting interfaces. Accordingly, holes, bulges or indents are made in the mounting interfaces in contact with the gasket. When under compression, this fixes the gasket relative to the mounting interfaces.

In an embodiment of the invention, an adhesive can be applied to one or more of the gasket layers, to provide a simple fixation of the layers at least during assembly and mounting of the gasket in the SOC stack system. Adhesive may also be applied between the gasket and at least one of the adjacent mounting interfaces, likewise to provide a simple fixation of the elements during assembly of the gasket in the SOC system. In an embodiment of the invention, the gasket is mounted between an SOC stack and a process gas manifold which is to be connected to the SOC stack (this is normally called "external manifolding").

In an aspect of the invention a SOC stack system, comprising a plurality of stacked cells and a plurality of mounting interfaces is assembled. At least one sandwich structured gasket with at least three layers is located between two mounting interfaces. As earlier mentioned the mounting interface may comprise a SOC stack and process gas connections such as manifolds and flanged pipes. The assembly comprises the steps of manufacturing two gasket layers, the first and the third in the sandwich of a flexible gasket material. As discussed earlier, the material has to be flexible enough to compensate for vibrations, surface defects of the mounting interfaces and thermally originated movements and any other movements occurring during normal operation and start-up/shut-down procedures of the SOC stack. The gasket layers are manufactured to physically match the two mounting interfaces which they are mounted in-between. A further second gasket layer which is electrically insulating is also manufactured to physically match the two mounting interfaces as well as the first and the third gasket layer. Then the three gasket layers are assembled in the layer order 1-2-3, so the electrically insulating layer is sandwiched between the two flexible layers. After assembling the gasket sandwich, it is positioned between the two mounting interfaces (i.e. manifold and SOC stack), one way is to position the gasket sandwich on one of the two mounting interfaces, for instance on the mounting interface of the SOC stack. Finally, the other mounting interface, for instance the manifold is mounted on the gasket surface opposite the first mounting interface, so the gasket is positioned in-between the two mounting interfaces and compression is applied, whereby the gasket is compressed between the two mounting interfaces and a gas tight sealing is accomplished.

In a further embodiment of this aspect of the invention, an adhesive is applied to at least two surfaces of the gasket layers before the three-layer gasket sandwich is assembled, to fix the layers together at least until the SOC stack system has been assembled.

In a further embodiment of this assembly process, indentations or holes are made in at least one of the three gasket layers before they are assembled. When the gasket is compressed, this provides fixation of the gasket layers relative to each other during operation and thermal cycles of the stack system. The holes or indentations may be provided in the second and least flexible layer of the gasket, which provides the simplest manufacturing.

In an embodiment of the assembly process, also at least one of the mounting interfaces compressing the gasket are made with holes, indentations or bulges to provide fixation of the gasket relative to the contacting mounting interface. The gasket layers may be made of mica, the second layer of the gasket being less flexible than the first and the third layer, but electrically insulating.

Features of the Invention

1. Solid oxide cell stack system comprising a plurality of stacked cell units and mounting interfaces, the mounting interfaces comprising at least one gasket, wherein said gasket comprises a sandwich structure of at least three layers, a first and a third flexible layer which is flexible enough to compensate for vibrations, surface defects of the mounting interfaces and thermally originated movements and a second electrically insulating layer positioned in between the first and the third layer.

2. Solid oxide cell stack system according to feature 1, wherein the layers are made of mica, the first and the third layer is more flexible than the second layer.

3. Solid oxide cell stack system according to any of the preceding features, wherein the tensile strength of the second layer is between 60 and 180 N/mm2, preferably between 90 and 150 N/mm2.

4. Solid oxide cell stack system according to any of the preceding features, wherein the compressive strength at 200° C. of the second layer is between 180 and 300 N/mm2, preferably between 220 and 260 N/mm2.

5. Solid oxide cell stack system according to any of the preceding features, wherein the flexural strength of the second layer is between 150 and 250 N/mm2, preferably between 140 and 200 N/mm2.

6. Solid oxide cell stack system according to any of the preceding features, wherein the thickness of each of first, second and third layer is between 0.2 mm and 15 mm preferably between 0.4 mm and 5 mm.

7. Solid oxide cell stack system according to any of the preceding features, wherein indentations, holes or bulges are made in at least one of the three layers, to provide fixation of the layers relative to each other.

8. Solid oxide cell stack system according to feature 7, wherein holes are made in the second layer, to provide fixation of the layers relative to each other.

9. Solid oxide cell stack system according to any of the preceding features, wherein indentations, holes or bulges are made on at least one of the mounting interfaces which are in contact with the gasket to provide fixation of the gasket relative to the contacting mounting interfaces.

10. Solid oxide cell stack system according to any of the preceding features, wherein an adhesive is applied between the three layers.

11. Solid oxide cell stack system according to any of the preceding features, wherein said gasket is mounted between the cell stack and a process gas manifold.

12. Process for assembling a solid oxide cell stack system comprising a plurality of stacked cell units and a plurality of mounting interfaces and comprising at least one sandwich structured gasket with at least three layers to be located between two mounting interfaces, the process comprising the steps of manufacturing a first and a third gasket layer of the gasket in a flexible gasket material which is flexible enough to compensate for vibrations, surface defects of the mounting interfaces and thermally originated movements to physically match said two mounting interfaces, manufacturing a second gasket layer in an electrically insulating material to physically match said two mounting interfaces and the first and the second gasket layers, assembling the three layers with the second gasket layer sandwiched between the first and the third gasket layer, position the assembled gasket on one of the two mounting interfaces, mounting the other of the two mounting interfaces, and applying compression to the gasket between the two mounting interfaces.

13. Process according to feature 12, wherein adhesive is applied to at least two surfaces of the gasket layers before assembling of the three gasket layers.

14. Process according to feature 12 or 13, wherein indentations or holes are made in at least one of the three layers, to provide fixation of the layers relative to each other.

15. Process according to any of the features 12-14, wherein holes are made in the second layer, to provide fixation of the layers relative to each other.

16. Process according to any of the features 12-15, wherein indentations, holes or bulges are made on at least one of the mounting interfaces which are in contact with the gasket to provide fixation of the gasket relative to the contacting mounting interfaces.

17. Process according to any of the features 12-16, wherein the gasket layers are made of mica, the first and the third gasket layer is more flexible than the second layer.

The invention claimed is:

1. Solid oxide cell stack system comprising:
a plurality of stacked cell units and mounting interfaces, the mounting interfaces comprising at least one gasket, wherein said gasket comprises a sandwich structure comprising a first layer, a second layer, and a third layer, the first and third layers being formed of a flexible gasket material which is more flexible than the second layer and which compensates for vibrations, surface defects of the mounting interfaces and thermally originated movements, the second layer comprising an electrically insulating layer having a flexural strength between 140 and 250 N/mm$^2$ positioned in between the first and the third layer, wherein holes are made in the second layer, to provide fixation of the first, second and third layers relative to each other.

2. Solid oxide cell stack system according to claim 1, wherein the first layer, the second layer, and the third layer are made of mica.

3. Solid oxide cell stack system according to claim 1, wherein the tensile strength of the second layer is between 60 and 180 N/mm$^2$.

4. Solid oxide cell stack system according to claim 1, wherein the compressive strength at 200° C. of the second layer is between 180 and 300 N/mm$^2$.

5. Solid oxide cell stack system according to claim 1, wherein the flexural strength of the second layer is between 140 and 200 N/mm$^2$.

6. Solid oxide cell stack system according to claim 1, wherein the thickness of each of the first, second and third layer is between 0.2 mm and 15 mm.

7. Solid oxide cell stack system according to claim 1, wherein indentations or bulges are made in at least one of the first layer, the second layer, and the third layer, to provide fixation of the layers relative to each other.

8. Solid oxide cell stack system according to claim 1, wherein indentations, holes or bulges are made on at least one of the mounting interfaces which are in contact with the gasket to provide fixation of the gasket relative to the contacting mounting interfaces.

9. Solid oxide cell stack system according to claim 1, wherein an adhesive is applied between the three layers.

10. Solid oxide cell stack system according to claim 1, wherein said gasket is mounted between the cell stack and a process gas manifold.

11. Process for assembling a solid oxide cell stack system comprising a plurality of stacked cell units and a plurality of mounting interfaces and comprising at least one sandwich structured gasket comprising a first layer, a second layer, and a third layer to be located between two mounting interfaces, the process comprising the steps of:

- manufacturing the first layer and the third layer of the gasket of a flexible gasket material which is more flexible than the second layer of the gasket, and which compensates for vibrations, surface defects of the mounting interfaces and thermally originated movements to physically match said mounting interfaces,
- manufacturing the second layer from an electrically insulating material to physically match said two mounting interfaces and the first and the second layers, said second layer having a flexural strength between 140 and 250 N/mm² and being less flexible than either said first or third layers, wherein holes are made in the second layer, to provide fixation of the first, second and third layers relative to each other,
- assembling the first, second and third layers with the second gasket layer sandwiched between the first and the third layer,
- positioning the assembled gasket on one of the two mounting interfaces,
- mounting the other of the two mounting interfaces, and
- applying compression to the gasket between the two mounting interfaces.

12. Process according to claim 11, wherein adhesive is applied to at least two surfaces of the first layer, the second layer, and the third layer before assembling of the first layer, the second layer, and the third layer.

13. Process according to claim 11, wherein indentations are made in at least one of the first layer, the second layer, and the third layer, to provide fixation of the layers relative to each other.

14. Process according to claim 11, wherein indentations, holes or bulges are made on at least one of the mounting interfaces which are in contact with the gasket to provide fixation of the gasket relative to the contacting mounting interfaces.

15. Process according to claim 11, wherein the first layer, the second layer, and the third layer are made of mica.

* * * * *